Apr. 24, 1923.
E. FUCHS
MEASURING INSTRUMENT
Filed April 25, 1918
1,452,834
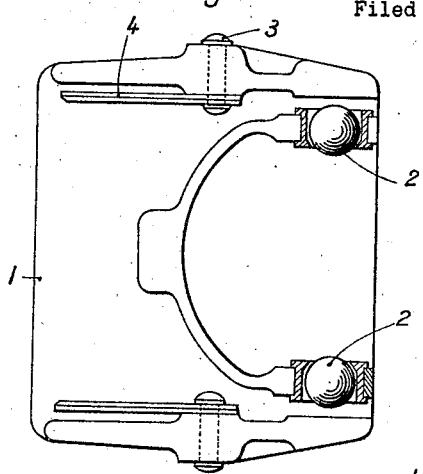
Fig. 1
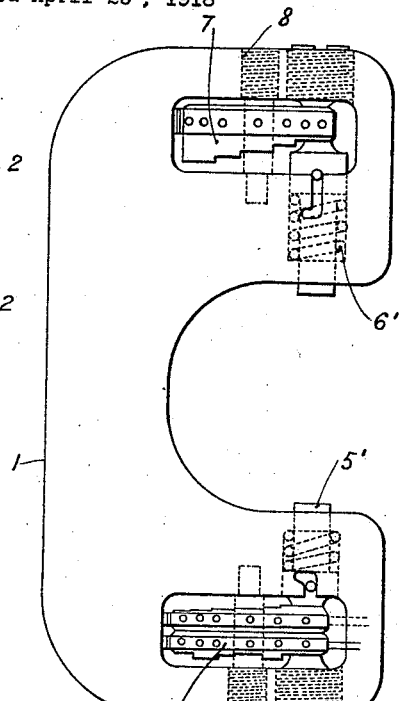
Fig. 3
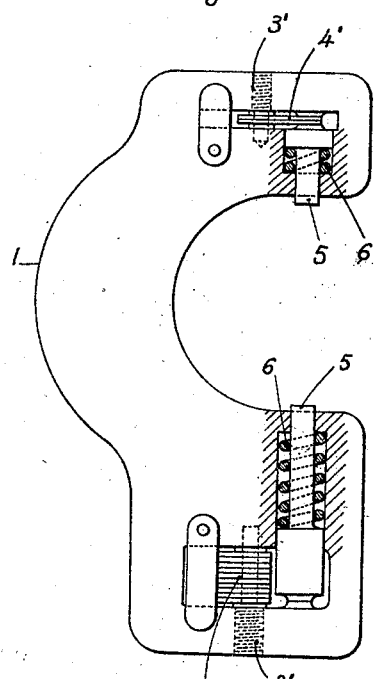
Fig. 2
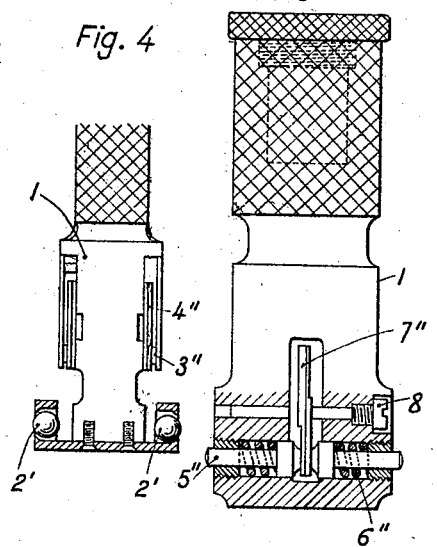
Fig. 4  Fig. 5
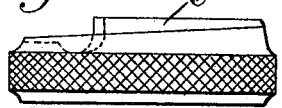
Fig. 3ᵃ
Inventor.
Ernest Fuchs
by Pennie Goldsborough & O'Neill
Attys.

Patented Apr. 24, 1923.

1,452,834

UNITED STATES PATENT OFFICE.

ERNEST FUCHS, OF PARIS, FRANCE, ASSIGNOR TO LOUIS RENAULT, OF BILLANCOURT, DEPARTMENT OF SEINE, FRANCE.

MEASURING INSTRUMENT.

Application filed April 25, 1918. Serial No. 230,821.

*To all whom it may concern:*

Be it known that I, ERNEST FUCHS, residing at 111 Boulevard Exelmans, at Paris, Department of the Seine, France, citizen of the French Republic, have invented certain new and useful Improvements in Measuring Instruments; and I do hereby declare the following to be a full, clear, and exact description of the invention, such as will enable others skilled in the art to which it appertains to make and use the same.

This invention relates to measuring instruments, such as calipers and the like, and particularly to means for rendering the same capable of testing a plurality of dimensions.

In the drawing:

Fig. 1 is an elevation, partly in section, of one embodiment of my invention applied to calipers of the fork type;

Fig. 2 is a similar view of a modification;

Fig. 3 is an elevation of a further modification;

Fig. 3ª is a detail view, showing a modification of the stepped cam shown in Fig. 3.

Fig. 4 is a view of a plug caliper with the invention applied thereto; and

Fig. 5 is a similar view of a modified form applied to the calipers of the plug type.

The body of the calipers in the several figures is indicated by the reference character 1.

In Fig. 1 the ball feelers 2 are carried in sockets in the body 1 and the distance between these balls is varied by a series of blades 4 adjacent to each ball, which blades are pivoted at 3. When the blades are turned to position the balls the frame of the instrument provides abutments for the blades on the sides opposite to those contacting with the balls. These blades are each of a known thickness and, therefore, one or more may be swung on the pivot 3 to adjust the balls 2.

In Fig. 2 the balls are replaced by cylindrical feelers 5, which are normally pushed apart by springs 6. In this form the blades 4' are pivoted at 3' and are operated in the same manner as described in connection with Fig. 1, the blades being swung in behind the feelers, separately or collectively.

In Fig. 3 the feelers 5' are urged away from each other by springs 6' and the step cams 7 are pivoted at 8. These cams may be swung behind the feelers 5' so as to cause them to project to various degrees, the degree depending upon the thickness of the portion of the cam behind the feelers. On the outer end of each of the feelers 5' is a pin adapted to engage a suitably shaped slot in the body of the instrument to provide a bayonet joint. Either of the feelers can be moved outwardly against the action of its spring and held stationary by its bayonet connection to meet certain measuring requirements. In lieu of the cam illustrated in Fig. 3, such a cam as illustrated in Fig. 3ª may be used, the cam surface being indicated by the reference character 6''. As the operation is obvious, this will not be described in detail.

In Fig. 4 a caliper for inside measurements is shown. The balls 2' are inserted in sockets in the body 1 and are urged outwardly by blades 4'', which are pivoted at 3'' and operate as blades 4 which have been previously described.

In Fig. 5 calipers for inside measurements are illustrated and in this form the feelers 5'' are urged inwardly by springs 6''. These feelers can be moved outwardly against the action of their springs by a cam 7'', which is pivoted at 8'' and operates similarly to cam 7, previously described.

What I claim is:

1. A measuring instrument, having a pair of oppositely disposed and spaced apart feelers and a step by step spacing means pivoted to the instrument to be turned between an end of one of the feelers and an abutment on the instrument for moving one of said feelers relatively to the other to regulate the distance between the same.

2. A measuring instrument, having a pair of oppositely disposed spaced feelers and a stepped-cam associated with each feeler adapted to be interposed between the inner ends of said feelers and the adjacent portions of said instrument for regulating the distance between said feelers to various degrees.

3. A measuring instrument, having oppositely spaced jaws, a feeler adjustably mounted in one of said jaws, a series of step by step spacing elements adapted to be interposed between the inner end of said feeler and the adjacent portion of said instrument for regulating the distance between said jaws.

In testimony whereof I affix my signature, in presence of two witnesses.

ERNEST FUCHS.

Witnesses:
　CHAS. P. PRESSLY,
　A. BERT LOLLE.